Nov. 29, 1949 J. H. BURNETT 2,489,858
GRID CONTROL CIRCUIT FOR GAS TUBES
Filed Jan. 29, 1947 3 Sheets-Sheet 2

INVENTOR.
BY J. H. Burnett,
Neil W. Preston,
his ATTORNEY

Nov. 29, 1949    J. H. BURNETT    2,489,858
GRID CONTROL CIRCUIT FOR GAS TUBES
Filed Jan. 29, 1947    3 Sheets-Sheet 3

Patented Nov. 29, 1949

2,489,858

UNITED STATES PATENT OFFICE 2,489,858

GRID CONTROL CIRCUIT FOR GAS TUBES

James H. Burnett, Upper Montclair, N. J., assignor to Electrons, Incorporated, Newark, N. J., a corporation of Delaware Application January 29, 1947, Serial No. 725,036

22 Claims. (Cl. 315—274)

This invention relates to apparatus and circuits for controlling and varying the time in an operating cycle at which a gaseous electron discharge tube will fire and become conductive, so that the output of the tube may be accurately controlled for welding purposes, operation of servo mechanisms, or in connection with any type of circuit organization involving grid control gas tubes.

When the anode of a conventional gas discharge tube is supplied with alternating current, there is a critical grid potential for each point along a so-called critical grid voltage curve in the positive half-cycle of anode voltage at which the tube will fire. In order to control and vary this firing point of the tube, it is desirable to provide a grid control voltage which will intersect this critical grid voltage curve at a substantial angle to define the firing point accurately and consistently, in spite of the unavoidable variation in the grid control voltage, or any fixed grid bias voltage that may be used. Since the critical grid voltage curve for the usual type of gas discharge tube is relatively flat, it is desirable that the grid control voltage should have a relatively steep wave front, so as to intersect the critical grid voltage curve at well defined points for the different firing times in the cycle.

The primary object of this invention is to provide simple and effective means for obtaining a grid control voltage having a suitable wave form to intersect the critical grid voltage curve at well defined points for all firing times, and which may be readily and accurately shifted to cause firing of the tube at the desired points in the positive half-cycle of anode voltage.

Another object of the invention is to provide such grid voltage control means which will function to give accurate and consistent timing operation in spite of variations in the wave form of the grid controlling voltage as derived from the main alternating current supply for the anode of the tube, or as a correction signal from any source.

A still further object of the invention is to provide a grid voltage control means which may be combined with a fixed grid bias voltage in such a way as to extend the range of control of the firing of the tube for substantially all of the 180° of the positive half-cycle of anode voltage.

Various other objects, characteristic features, attributes and advantages of the invention will be in part apparent, and in part further explained as the description progresses.

The accompanying drawings illustrate certain specific embodiments of the invention, together with graphs or curves of current and voltage for explanatory purposes. The parts and circuits are illustrated diagrammatically in these drawings in accordance with certain conventions, more for the purpose of facilitating an explanation and understanding of the nature and mode of operation of the invention, than to show in detail the particular construction and arrangement of parts that may be employed in practice.

In these drawings.

The grid control means of this invention may be employed in connection with any conventional type of gas discharge tube, having a filling of a suitable ionizable gas or vapor, such as mercury vapor or a rare gas. Such a tube comprises some form of a hot emissive cathode, anode, and a control grid; and since the particular structural organization of such a tube is not material to this invention, a tube T of this type has been illustrated conventionally.

In a typical application of a controllable gas discharge tube of the type under consideration, the anode circuit includes a suitable source of alternating current, shown as the secondary of a main supply transformer 1, energized from a source of alternating current designated AC, and some form of a load represented schematically and designated Load. It may be said that the main function of a grid control means of this invention is to govern the potential on the grid of this tube T in such a way that the conduction of the tube may be initiated at any desired point during the positive half-cycle of anode voltage.

Figure 1:
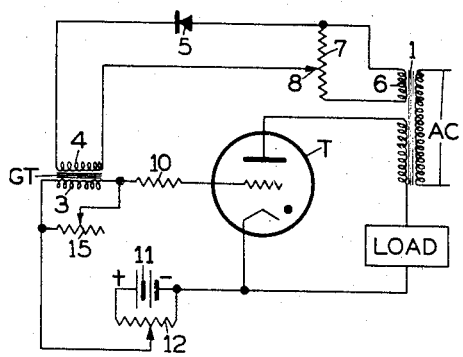
Fig. 1 illustrates one simplified embodiment of the invention.

In the embodiment of the invention shown in Fig. 1, the voltage for governing the potential of the grid is obtained from the secondary 3 of a grid transformer GT, which has its primary 4 connected through a half-wave rectifier 5 to a suitable source of variable alternating voltage derived from the main source of voltage for the anode of the tube. This rectifier 5 may be a dry plate rectifier of the copper oxide, or selenium or similar type, or a high vacuum diode to eliminate back leak may be employed. As shown in Fig. 1, a secondary 6 of the main power supply transformer 1 energizes a resistance or inductance 7, and the desired voltage drop along this resistance is supplied to the primary 4 of the grid transformer GT through the rectifier 5. Any suitable manually operated or automatic means, illustrated diagrammatically as a sliding contactor 8, may be employed to obtain the desired voltage for the primary of the grid transformer GT from the drop along the resistance 7.

As shown the grid circuit also includes, in addition to the usual grid resistor 10 for limiting the amount of grid current for positive potentials on the grid, a source of positive grid bias, shown as a battery 11 and resistor 12. An adjustable shunt resistor 15 of high resistance may also be employed for the secondary 3 of the grid transformer GT, for reasons hereafter discussed.

Figure 3:
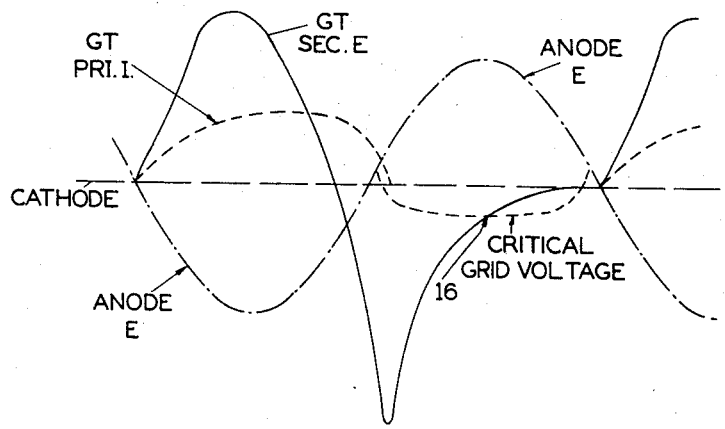
Figs. 3 to 5 show graphs or curves of certain current and voltages representative of typical operating conditions for explanatory purposes.
Figure 4:
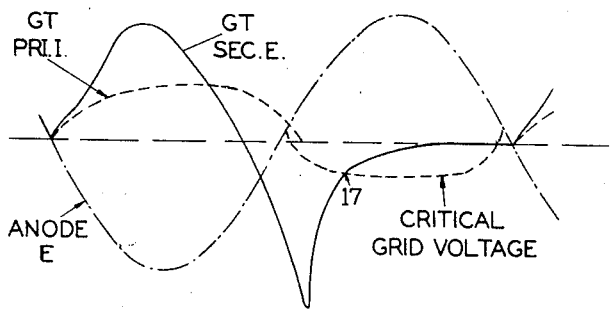
Figure 5:
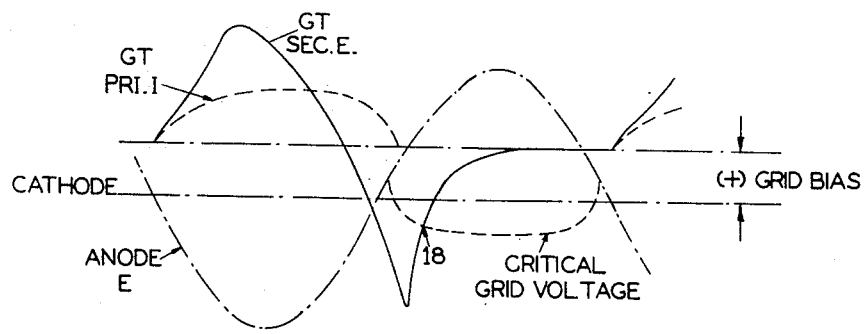

In describing the contemplated mode of operation of the circuit organizations embodying this invention, it is convenient, to refer to the graphs or curves of certain current and voltages for typical operating conditions, such as shown in Figs. 3 to 5. It should be understood that these curves are presented merely for explanatory purposes, and are not intended to be quantitatively accurate, nor applicable to all of the different physical forms which the grid control means of this invention may take. These curves include for one complete cycle and part of the next cycle the curve of anode voltage E for the tube T, the "critical grid voltage" for this tube, and the primary current and secondary voltage of the grid transformer, as designated "GT Pri. I" and "GT Sec. E" on the drawings. These curves indicate generally the changes in the value of these voltages under ordinary operating conditions and their time phase relation.

In these curves of Figs. 3 to 5, the critical grid voltage curve represents the negative potential of the grid with respect to the cathode required in a typical gas discharge tube to prevent firing of the tube at corresponding anode voltages, taking into consideration the grid control characteristics of the particular tube. In other words, when the grid at any point in the positive half-cycle of anode voltage assumes a potential more positive than represented by the critical grid voltage curve in these Figs. 3 to 5, the tube is rendered conductive. Generally speaking, the purpose of this invention is to provide a controllable voltage on the grid of the gas tube T during the positive half-cycle of anode voltage which assumes a value corresponding with the critical grid voltage curve at a well defined point in the cycle to give the desired firing time for the tube.

Considering the general plan of operation of grid control means of this invention as shown in Fig. 1, the voltage supply to the primary 4 of the grid transformer GT through the rectifier 5 is phased by appropriate connections to be 180° out of phase with the anode voltage, so that primary current for the grid transformer GT rises and falls while the voltage on the anode is negative, as indicated by the curve of the primary current "GT Pri. I" in Fig. 3. The rectifier 5 limits the supply of current from the alternating voltage supply to the primary 4 to a half-cycle. The rise and fall of the primary current for the grid transformer GT is accompanied by an induced voltage in the secondary 3 of this transformer, which has a wave form of the general shape indicated for "GT Sec. E" in Fig. 3. This secondary voltage at first rises to a positive value as the primary magnetizing current increases, and then reverses to a negative value as this current decreases. Due to the action of a rectifier 5, the grid transformer GT is intermittently excited at half-cycle intervals; and in a sense the steady state condition may be said to be a repetition of like transients. The various complicated factors involved in connection with the current and voltage changes for such transients, including the non-linear characteristics of the magnetization curves for iron, render any simple analysis of the curve and voltage changes impractical.

For the purpose of this case, it is sufficient to note that the secondary voltage of the grid transformer GT under these conditions assumes a negative peak value near the beginning of the positive half-cycle of anode voltage, and then decays at a rate determined by the general time constants of the circuit. When this decaying negative secondary voltage of the grid transformer GT assumes a value corresponding with the critical grid voltage, i. e. when the curve of this decaying negative voltage on the grid intersects the critical grid voltage curve, as indicated at 16 in Fig. 3, the tube will fire.

Generally speaking, the peak value of the negative voltage on the grid from the secondary of the grid transformer GT, and in turn the time required for it to decay to a predetermined value, may be said to be dependent upon the amount of energy supplied to the primary of the grid transformer GT, so that by varying this input energy the firing point of the tube may be controlled. Thus, by reducing the voltage applied to the primary 4 of the grid transformer GT by shifting the position of the contactor 8 in Fig. 1, the secondary voltage will have a lower peak value, as indicated in Fig. 4, and will take a correspondingly shorter time to decay and intersect the critical grid voltage curve, thereby advancing the firing time of the tube T to a point indicated at 17 in Fig. 4. In other words, by reducing the excitation of the grid transformer GT, the firing time of the tube T is advanced, and conversely by increasing this excitation, the firing time of the tube T is retarded. It will be evident that the excitation of the grid transformer GT may be raised to a point where the negative peak value and rate of decay of the grid control voltages will give negative grid potentials high enough to prevent firing of the tube at any point in the positive half cycle of anode voltage.

The rate of decay of the negative secondary voltage of the grid transformer GT for a given peak value is dependent upon the time constants of the various circuit elements, such as the resistance to reactance ratio of windings of the transformer, and resistances associated with their circuits. In order that this rate of decay of the negative secondary voltage of the grid transformer may be changed or regulated to satisfy different operating conditions, or compensate for the type of transformer used, an adjustable high resistance 15 may be connected across the secondary winding of the transformer GT as shown, to be adjusted as conditions may require. Once the appropriate rate of decay of the negative secondary voltage has been fixed, however, this rate of decay for a given peak value of negative voltage is uniformly consistent; and when the desired firing time for the tube T has been determined by the degree of excitation of the grid transformer GT, this firing time is accurate and consistent for successive cycles.

The usual type of gas discharge tube requires a certain anode voltage to become conductive when the grid potential is zero, since a certain anode voltage is required for ionization to initiate a discharge. Accordingly, near the beginning of a cycle, where the anode voltage is low, a positive potential on the grid is required to fire the tube. This condition is indicated by the shape of the critical grid voltage curve in Fig. 3. In order to provide firing control at these low anode voltages, a steady positive bias on the grid of the tube T may be provided, as by the battery 11 and resistance 12, illustrated in Fig. 1. If such a positive bias is added, the same variations in secondary voltage of the grid transformer may be considered as taking place about an axis displaced with respect to the cathode as shown in Fig. 5, so that the same negative secondary voltage of the grid transformer shown in Fig. 4 will with the positive bias, initiate firing of the tube at an earlier point indicated at 18 in Fig. 5. By appropriate selection of the positive bias voltage and shape of the curve of secondary voltage of the grid transformer GT, the grid of the tube T may be made sufficiently positive to fire the tube during the first part of the positive half-cycle of anode voltage. This is desirable in certain applications of grid control rectifiers, where it is desired to control conduction through the tube for a larger part of the entire 180°, independently of the grid control characteristics of the particular tube.

Thus, variations in the steady biasing voltage on the grid of the tube T, as well as variations in the input energy to the grid transformer GT, may be employed to control the firing time of the tube; and it is contemplated that either or both of these variations may be employed in practicing the invention.

Figure 2:
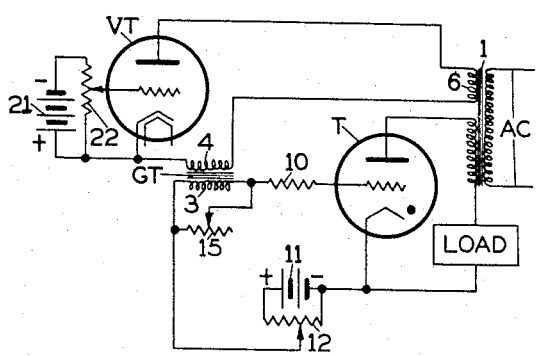
Fig. 2 illustrates a modified organization for governing the excitation of the grid transformer in Fig. 1.

Figure 2 illustrates a modified arrangement for governing the amount of current supplied to the primary of the grid transformer GT, and the resultant peak value of the voltage induced in its secondary and firing time of the tube T. In this modification of Fig. 2, a vacuum tube VT of any one of the well known types, having of course the appropriate operating characteristics, is used to regulate the supply of rectified current to the primary 4 of the grid transformer GT from the voltage supply of the secondary 6 of the main transformer 1. In other words, the tube VT passes current during one half-cycle only of voltage derived from the same voltage source for the anode of the gas discharge tube, but 180° out of phase with this anode voltage, so that current is supplied to the primary 4 of transformer GT during the negative half-cycles only of anode voltage. The potential of the grid of the tube VT may be varied in any suitable manner to control the amount of current supplied to the primary 4 of the grid transformer GT. As illustrated, a potentiometer arrangement, including a battery 21 and a resistance 22 is used to provide a controllable potential for the grid of the tube VT.

Variations of the potential upon the grid of the tube VT serve to vary the amplitude of the primary current starting in phase with the supply voltage from the secondary 6 of transformer 1, thereby acting to vary the secondary voltage of grid transformer GT in the same manner and with the same result described in connection with Fig. 1. The potential on the grid of the tube VT may also be controlled to delay conduction of current through this tube to the primary 4 of the grid transformer, until the supply of voltage on the anode of tube VT has risen to a predetermined value. In other words, the grid of the tube VT may be controlled to determine the duration, as well as the amplitude of current, supplied to the primary 4 of the grid transformer GT. This affords a somewhat wider range of control, which may be desirable for some applications. In general, the modification of Fig. 2 operates in the same way previously described, and in effect represents another expedient for varying the excitation of the grid transformer GT to control the firing time of the tube T.

One significant characteristic of the grid control means of this invention is that the decaying negative voltage of the secondary of the grid transformer GT has a relatively steep wave front and intersects the critical grid voltage curve at a well defined point. Also, by appropriate proportioning of the parts, a substantial variation in the primary current for the grid transformer GT may be required to change the fiing point of the tube T; and consequently the firing time of the tube T is uniformly consistent in spite of small variations in the supply voltage, in contrast with grid control systems operating by phase shifting a sinusoidal voltage wave derived from the supply voltage, where variations in the instantaneous value of the supply voltage and in turn the phase shifted voltage used to control the firing time affects this firing time.

Another significant characteristic of the grid control means of this invention is that the rate of decay of the negative secondary voltage of the grid transformer GT and in turn the firing time of the tube, are virtually independent of the wave form of the voltage applied to this grid transformer, since the peak value of its negative secondary voltage and its rate of decay are more a matter of the amount of energy supplied to the primary of the transformer and the fixed time constants of the circuit, than the instantaneous values of the voltage applied to this primary. Consequently, changes in the wave shape or instantaneous values of the voltage used for governing the firing time of the gas tube do not materially affect this firing time when determined by the grid control means of this invention.

In this connection, grid control rectifiers are often employed in situations where the wave form or instantaneous values of the main alternating current supply, and in turn the wave form of the voltage used for governing the firing time of the tube, are varied or distorted from time to time by other apparatus or equipment associated with this main supply, such as by the application of heavy peak loads, introduction of harmonics by rectifiers, and other conditions often encountered in practice. Such variations in the wave form of the main supply voltage do not appreciably affect the firing time of a tube governed by the grid control means of this invention, although with other types of grid control, each change in wave shape or instantaneous value affects the particular firing time then set up.

Figure 6:
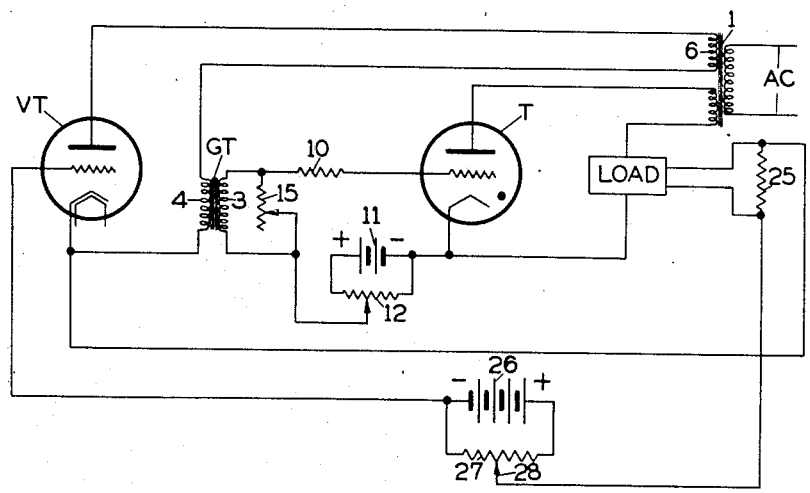
Fig. 6 shows a generalized organization for utilizing the characteristic features of the invention in connection with apparatus where the control voltage or correction signal automatically governing the firing time of a tube has an inherent ripple or distorted wave form.

This feature of uniform and consistent control of the firing time independently of the wave form of the control voltage is particularly useful in connection with control of the firing time of a gas tube in response to a control voltage or correction signal which has an inherent ripple or variable wave form, as for example in the case of the arc drop across the electrodes in an electric furnace, a voltage drop associated with a motor in motor systems, or the correction signal in certain types of servo-mechanisms. Fig. 6 illustrates a simplified and generalized example to show how the grid control means of this invention serves to provide acceptable grid control for such situations.

Referring to Fig. 6, it is assumed that the tube T is to be used for supplying current to a load device, designated generally as a load, such as a motor or the like for operating or positioning some movable element, and that the purpose of the organization is to regulate the firing of this tube T to conform with a control voltage or correction signal having an inherent ripple or distorted wave form. As shown, it is assumed that the control voltage governing the firing of the tube is represented by the voltage across a resistor 25, and that the firing of the tube T is to be automatically controlled to maintain a predetermined voltage across this resistor.

Assuming these conditions, the tube VT in Fig. 6 acts to govern the firing time of the tube T in the same manner discussed in connection with Fig. 2, and the grid of this tube VT is governed in accordance with the control voltage across the resistor 25 and a reference voltage. As illustrated, a battery 26 energizes a resistor 27, and the reference voltage is the drop across the portion of this resistor selected by a slider 28. With the polarities assumed as indicated, it can be seen that the control voltage from the load across the resistor 25 is in opposition to the reference voltage.

In discussing the operation of the organization shown in Fig. 6, it is convenient to assume certain conditions for a typical example; but it should be understood that these are merely illustrative and explanatory, and that the invention is applicable to various other conditions. As a typical example of the operation, assume that the desired condition of the load device to be maintained by automatic control of the firing of the tube T exists at a given time when the tube T is firing at a point, such as indicated at 17 in Fig. 4. Under these conditions, the existing potential on the grid of the tube VT, say one voltage positive, serves to supply the appropriate amount of current to the primary of the grid transformer GT to provide a secondary voltage curve shown in Fig. 4 to correspond with this firing time. If now conditions of the load device change to call for a reduction in input current by delaying the firing time of the tube T, as for example, if the load on the motor is decreased and it tends to increase speed, in the arrangement illustrated it is assumed that the control voltage from the load device across the resistor 25 increases. This in turn increases the positive potential on the grid of the tube VT, increases the current through the primary of the grid transformer GT, and increases the negative peak value of the secondary voltage and the time of its decay to delay the firing time of the tube T, such as to the point 16 in Fig. 3. Similarly, if a change in the conditions of the load device occurs calling for increased input by advance in the firing time of the tube T, the accompanying decrease in the control voltage across resistor 25 reduces the potential on the grid of the tube VT, thereby reducing the current to the primary of the grid transformer GT, the peak value of its secondary voltage, and advancing the firing time.

In such an arrangement of automatic control in response to a control voltage or correction signal, the control of the firing time afforded by this invention is not appreciably affected by the wave or variations in the instantaneous value of such control voltage or correction signal; and it is this attribute which makes the method of grid control characteristic of this invention particularly useful in various applications where there is an inherent ripple or variation in a wave form of the voltage or correction signal.

Figure 7:
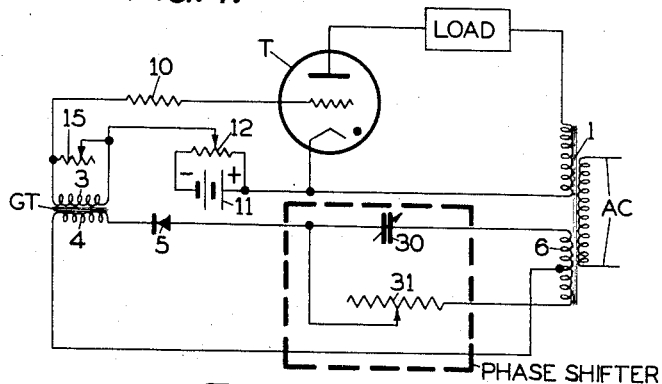
Fig. 7 shows a modified organization involving phase shifting of the secondary voltage of the grid transformer.
Figure 8:
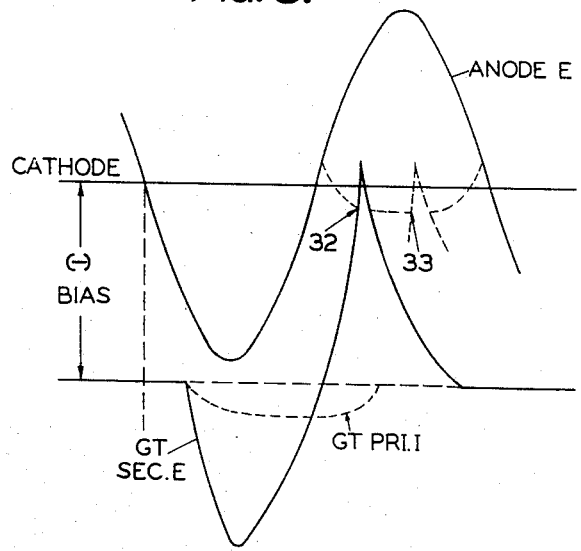
Fig. 8 shows graphs of the voltages and currents for the modified organization of Fig. 7.

Fig. 7 illustrates another form of the invention where the firing time of the gas tube is varied by phase shifting the peaked portion of the secondary voltage of the grid transformer GT, rather than by varying its amplitude. In this modified arrangement, the secondary 6 of the main supply transformer 1 is connected through a suitable phase shifting organization to the primary 4 of the grid transformer GT through a rectifier 5, and the connections are such that the voltage of the primary of the grid transformer is in phase with the anode voltage and the primary current and secondary voltage of the grid transformer GT are negative during the negative half-cycle of the anode voltage, as indicated in the graphs of Fig. 8. Consequently the peaked portion of the secondary voltage is positive during the positive half-cycle of the anode voltage.

Assuming that the circuit elements are proportioned or adjusted so as to provide a secondary voltage of the grid transformer GT of some predetermined wave form and peak value, such as illustrated in Fig. 8, a negative bias for the tube T afforded by the battery 11 and resistor 12 is chosen such that the peak of this secondary voltage has the appropriate value with respect to the cathode to intersect the critical grid voltage curve for the tube T, with such margin of positive value as may be expedient. The firing time is varied by shifting the phase relation of the primary voltage of the grid transformer GT with respect to the anode voltage, and in turn the point where the peaked portion of the secondary voltage of this grid transformer GT intersects the critical grid voltage curve. For example, with the form of grid voltage curve assumed and shown in Fig. 8 and the phase relation as indicated, the tube T will fire at the point indicated at 32. It can be seen that by phase shifting the primary voltage of the grid transformer, the peaked portion of the secondary voltage may be advanced or retarded with respect to the anode voltage and the critical grid voltage curve of the tube T, thereby varying the firing time. For example, if the primary voltage of the grid transformer is delayed in phase, the firing time may be delayed to the point indicated at 33 in Fig. 8.

Thus, by phase shifting the peaked secondary voltage of a uniform amplitude, rather than varying its amplitude and rate of decay, the firing time of the tube T may be varied. Any suitable type of means may be employed for shifting the phase relation of the primary voltage of the grid transformer GT and the anode voltage. In the simplified arrangement shown in Fig. 7, the two halves of a center tapped secondary 6 of the supply transformer 1 are connected through a capacitor 30 and a resistor 31 to the primary 4 of the grid transformer GT through the rectifier 5. By adjusting the values of either the capacitor 30 or the resistor 31, the phase relation of the primary voltage of the grid transformer GT with respect to the anode voltage may be varied in the same way characteristics of phase shifting devices of this character, and in a manner that can be readily understood without further explanation.

Figure 9:
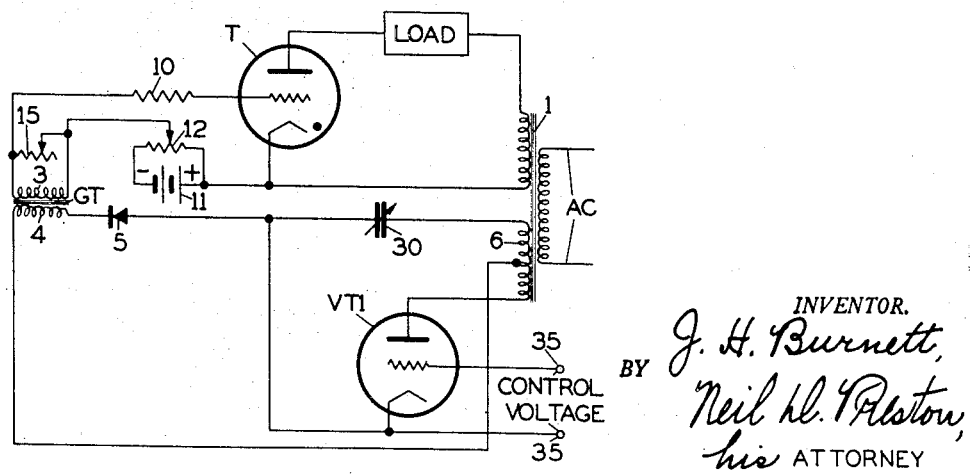
Fig. 9 illustrates a modification of the organization of Fig. 7 for providing automatic phase shifting control.

Fig. 9 illustrates a modification of the phase shifting organization of Fig. 7, where a vacuum tube VT1 is used in place of the variable resistor 31 in Fig. 7, so that the phase relation may be automatically shifted in response to a control voltage applied to the terminals 35 for the control voltage for the grid circuit of this tube VT1, in a manner that can be readily understood by one familiar with this type of phase shifting means without further explanation.

From the foregoing, it can be seen that the circuit organizations of this invention provide simple and effective means for accurately and consistently regulating the firing time of a gas discharge tube, employing simple and conventional devices for this purpose.

It will be apparent that the functions and mode of operation characterizing this invention may be accomplished by a variety of circuit organizations; and should be understood that various adaptations, modifications, and additions may be made in the specific embodiments of the invention illustrated and described without departing from the invention.

What I claim is:

1. In a circuit organization of the character described for controlling the firing time of a grid control gas discharge tube, a gas tube having its anode energized with an alternating voltage, a grid circuit for the tube, a grid transformer having its secondary included in said grid circuit, and means including a half-wave rectifying element for supplying current from said alternating voltage to the primary of said grid transformer during the negative half-cycles only of anode voltage, the secondary voltage wave of said grid transformer having a peaked portion for intersecting the critical grid voltage curve of the tube to define the firing time of said tube.

2. In a circuit organization of the character described for controlling the firing time of a grid control gaseous discharge tube having its anode energized with an alternating voltage, the combination of a grid circuit for said tube, a grid transformer having its secondary included in said grid circuit a primary circuit for said grid transformer including half-wave rectifying means, and means for supplying to said primary circuit an alternating voltage in a predetermined phase relation to the anode voltage for the tube, said rectifying means permitting current to flow in the primary of said grid transformer only during the negative half cycles of the anode voltage, the secondary voltage wave of said grid transformer having a peaked portion with a relatively steep wave front for intersecting the critical voltage curve for the tube to define the firing time of the tube.

3. A circuit organization for governing the firing time of a gaseous discharge tube having its anode circuit energized with an alternating voltage comprising in combination, a grid circuit for said tube, a grid transformer having its secondary included in said grid circuit, and circuit means including a rectifier for exciting the primary of said grid transformer with a voltage in a predetermined phase relation to the anode voltage of the tube during the negative half-cycle only of said anode voltage, said grid transformer providing a secondary voltage wave during the positive half-cycle of anode voltage having a peaked portion with a relatively steep wave front to intersect the critical grid voltage curve of the tube at a definite point to define the firing time of the tube.

4. In a circuit organization for governing the firing time of a grid control gaseous discharge tube having its anode energized with an alternating voltage, a grid circuit for the tube, a grid transformer having its secondary included in said grid circuit, circuit means including a rectifying element for supplying current to the primary of said transformer during the negative half-cycles only of the anode voltage for the tube, the voltage induced in the secondary of said grid transformer having a peak negative value near the beginning of the positive half-cycles of anode voltage and decaying with a relatively steep wave front, and controllable means for governing the current supplied to the primary of said grid transformer and in turn the peak value of the negative secondary voltage and the time required for it to decay to a predetermined value.

5. Control means for grid control gas discharge tubes comprising, a grid transformer having its secondary included in the grid circuit of the tube, circuit means including a rectifying element for supplying current to the primary of said transformer during the negative half-cycles only of anode voltage for the tube, said secondary of said transformer providing a negative grid voltage decaying from a peak value near the beginning of the half-cycle of positive anode voltage at a predetermined high rate, said decaying secondary voltage of said grid transformer causing firing of the tube when such secondary voltage assumes a value corresponding with the critical grid voltage for the tube.

6. A circuit organization for governing the firing time of a grid control gas discharge tube comprising, in combination with an anode circuit for the tube energized with an alternating voltage, a grid circuit for the tube, a grid transformer having its secondary included in said grid circuit, a primary circuit for said grid transformer including half-wave rectifying means for passing current during the negative half cycles of said anode voltage, and means for supplying to said primary circuit an alternating voltage in phase opposition to the anode voltage of the tube, and means for governing the energization of said primary of said grid transformer to vary the values of the negative voltage existing in the secondary of said grid transformer during the positive half-cycles of anode voltage, and thereby change the firing time of the tube.

7. A circuit organization for governing the firing time of a grid control gas discharge tube having its anode energized with an alternating voltage comprising, a grid circuit for said tube, circuit means connected with said grid circuit and including a circuit element having inductance and a rectifier, said circuit means being energized by said alternating voltage and acting to create in said grid circuit a negative grid voltage during the positive half cycles of anode voltage, said circuit element acting to provide a negative voltage decaying at a predetermined high rate from a peak value near the beginning of the positive half-cycle of anode voltage, and regulatory electrical means for governing the energization of said circuit element to vary the peak value of said negative grid voltage and thereby change the firing time of the tube in the cycle.

8. In a circuit organization for governing the firing time of a grid control gaseous discharge tube having its anode energized with alternating voltage, the combination with a grid circuit for said tube, of a circuit element electrically associated with said grid circuit and having inductance, circuit means including a rectifying element for supplying current to said circuit element during the negative half-cycles only of anode voltage in a predetermined phase relation to said anode voltage, said circuit element acting to provide in said grid circuit during the positive half-cycles of anode voltage a voltage wave having a peaked portion with a relatively steep wave front for intersecting the critical grid voltage curve for the tube, and electrically operable control means for varying the time in the positive half-cycle of anode voltage where the peaked portion of said voltage wave intersects the critical grid voltage curve of said tube and thereby govern its firing time.

9. In a circuit organization of the character described for governing the firing time of a gaseous discharge tube having its anode energized by alternating voltage, the combination with a grid circuit for said tube, of a grid transformer having its secondary included in said grid circuit, circuit means including a rectifier for energizing the primary of said transformer during the negative half-cycles only of the anode voltage, said means acting to provide a voltage wave in the secondary of said transformer having a peaked portion with a relatively steep wave front, and adjustable means for varying the load on said grid transformer and thereby vary the shape of said secondary voltage wave.

10. In a circuit organization for governing the firing time of a gas discharge tube, a grid transformer, a grid circuit for the tube including an adjustable positive biasing voltage and the secondary of said grid transformer, circuit means including a rectifier for supplying current of a controllable magnitude to the primary of said grid transformer during the negative half-cycles only of anode voltage for the tube, said secondary having a voltage induced therein decaying rapidly in negative values during the positive half-cycle of anode voltage, said decaying negative voltage combining with the biasing voltage in said grid circuit to determine the firing time of the tube dependent upon the magnitude of current supplied to the primary of said grid transformer and the value of said biasing voltage.

11. Grid control apparatus of the character described for gas discharge tubes comprising, in combination with an anode circuit for the tube energized with an alternating voltage, a grid circuit for the tube, a grid transformer having its secondary included in said grid circuit, circuit means including a rectifier for supplying current to the primary of said transformer during the negative half-cycles only of anode voltage, the voltage induced in the secondary of said transformer having a peak value and decaying at a predetermined rapid rate, and means for adjusting the rate of decay of said negative secondary voltage.

12. Grid control means for gas discharge tubes for governing the firing time of a gaseous discharge tube having its anode energized from a source of alternating voltage comprising, a grid circuit for the tube including a steady bias voltage and a circuit element having inductance, a circuit energized from said source of alternating voltage and including a rectifier for supplying current to said circuit element during the negative half-cycles only of the anode voltage, said circuit element acting to provide during each positive half-cycle of anode voltage a voltage wave in the grid circuit rising and falling from a peak value at a relatively high rate, and controllable means for varying the point in the positive half-cycle of anode voltage where the secondary voltage wave of said grid transformer intersects the critical grid voltage curve of said tube and thereby varying the firing time of the tube.

13. Apparatus of the character described for governing the firing time of a grid control gaseous discharge tube comprising, a grid circuit for said tube including a steady biasing voltage and the secondary of a grid transformer, circuit means including a rectifier for exciting the primary of said grid transformer with half-cycles of voltages only in a predetermined phase relation to the anode voltage, each half-cycle of current in the primary of said grid transformer inducing in its secondary and in said grid circuit a negative voltage decaying at a predetermined rate from a peak value near the beginning of the positive half-cycle of anode voltage, and means associated with said grid transformer for governing the current supplied to its primary and in turn the values of said decaying negative voltage induced in its secondary.

14. A circuit organization for governing the firing time of gas discharge tubes having the usual anode energized with an alternating voltage comprising, a circuit for the grid of said tube including a steady biasing voltage, a transformer having its secondary associated with said grid circuit for providing a voltage therein to combine with the biasing voltage and determine the grid potential, and circuit means including a rectifier for supplying current to the primary of said transformer during the negative half-cycles only of the anode voltage of said tube, said transformer acting to provide during the positive half-cycle of anode current a negative grid voltage in said grid circuit decaying at a predetermined high rate from a peak value dependent upon the primary current supplied to said transformer, said negative grid voltage causing firing of a tube when it has decayed to a value corresponding with the critical grid voltage for the tube.

15. Grid control means for gas discharge tubes to govern the firing time of the tube comprising, a grid transformer, a grid circuit for the tube including the secondary of said grid transformer, circuit means including a rectifier for supplying current to the primary of said grid transformer during the negative half-cycles only of anode voltage for the tube, the voltage induced in the secondary of said grid transformer during the positive half-cycle of anode voltage having a peaked portion with relatively steep wave fronts, and adjustable means for providing a steady biasing voltage in said grid circuit.

16. In a circuit organization for governing the firing time of a grid control gas discharge tube having its anode energized with alternating voltage, a grid transformer, a grid circuit for the tube including the secondary of said grid transformer, a vacuum triode for supplying current to the primary of said grid transformer during the negative half-cycles only of anode voltage of the tube, the voltage in the secondary of said grid transformer decaying rapidly from a negative peak value near the beginning of the positive half-cycle of anode voltage, the negative peak value of said secondary voltage and in turn the firing time of the tube being dependent upon the energization of the primary of said grid transformer, and means for governing the potential of the grid of said triode to vary the excitation of the primary of said grid transformer and thereby control the firing time of the tube.

17. A circuit organization for governing the firing time of a grid control gas tube comprising, a grid transformer, a grid circuit for the tube including the secondary of said grid transformer, means for providing an adjustable steady biasing voltage in said grid circuit, a vacuum triode having its plate circuit energized with alternating voltage in phase opposition to the anode voltage of the tube, said grid transformer having its primary included in said plate circuit of said triode, and means for controlling the grid potential of said triode to vary the excitation of the primary of said grid transformer and in turn the impulse voltage in its secondary cooperating with said biasing voltage to determine the firing time of the gas tube.

18. Grid control means of the character described for governing the firing time of grid control gas discharge tubes comprising, a grid circuit for the gas tube, a grid transformer having its secondary included in said grid circuit, means providing a steady positive biasing voltage in said grid circuit, a vacuum triode for supplying current to the primary of said grid transformer during the negative half-cycles only of anode voltage for the tube, the voltage in the secondary of said grid transformer decaying with a relatively steep wave front from a negative peak value to cause firing of the tube when such decaying negative voltage combines with the biasing voltage to give a grid potential corresponding with the critical grid voltage curve of the tube, and means for governing the grid potential of said triode to vary the energization of the primary of said grid transformer and the values of the negative secondary voltage.

19. A circuit organization for governing the firing time of a gaseous discharge tube having its anode circuit energized by an alternating voltage comprising in combination, a grid circuit for said tube, a grid transformer having its secondary included in said grid circuit, circuit means including a rectifying element for exciting the primary of said grid transformer during the negative half-cycle only of the anode voltage with a half-cycle only of voltage derived from said anode voltage, said grid transformer providing a voltage wave in its secondary during the positive half-cycle of anode voltage having a peaked portion with a relatively steep wave front, and phase shifting means for varying the phase relation of the voltage exciting the primary of said grid transformer with respect to said anode voltage.

20. A circuit organization of the character described for governing the firing time of a gaseous discharge tube having its anode circuit energized by an alternating voltage comprising in combination, a grid circuit for said tube, a grid transformer having its secondary included in said grid circuit, a circuit for the primary of said grid transformer energized from the alternating voltage for said anode and including a half-wave rectifying element, controllable means for energizing said primary circuit with alternating current in a variable phase relation to said anode voltage, said rectifying element acting to permit energization of the primary of said grid transformer during the negative half-cycles only of anode voltage, said grid transformer providing a secondary voltage wave during the positive half-cycle of anode voltage having a peaked portion with a relatively steep wave front for determining the firing point of the tube in accordance with the phase relation of the voltage exciting the primary of the grid transformer and the anode voltage.

21. In a circuit organization of the character described for controlling the grid of a gaseous discharge tube having its anode energized with an alternating current voltage, the combination with a grid circuit for said tube including a steady negative biasing voltage, a grid transformer having its secondary included in said grid circuit, circuit means including a rectifying element for exciting the primary of said grid transformer during the negative half-cycles only of anode voltage with half-cycles only of voltage derived from the anode voltage, the secondary of said grid transformer having induced therein a voltage wave with a peaked portion having a relatively steep wave front occurring during a positive half-cycle of anode voltage, and phase shifting means for varying the phase relation of the exciting voltage for the primary of said grid transformer with respect to the anode voltage.

22. A circuit organization for governing the firing time of a grid control gas tube comprising in combination, a source of alternating voltage for the anode circuit of the tube, a transformer having its secondary winding included in the grid circuit of the tube, a circuit including a rectifying element for supplying voltage from said source for energization of the primary of said grid transformer during the periods the anode voltage is negative, such energization of the primary of said transformer inducing in its secondary and in said grid circuit a grid control voltage having a negative peak value near the beginning of the positive half cycle of anode voltage and decaying from said peak value with a relatively steep wave front at a rate determined by the circuit time constants, said negative peak value of the grid control voltage and the firing time of the tube varying with the degree of energization of the primary of said transformer largely independent of the wave form of the energizing voltage, and means associated with said circuit for controlling the degree of energization of the primary of said transformer to govern the firing time of the tube.

JAMES H. BURNETT.

REFERENCES CITED

The following references are of record in the file of this patent:

UNITED STATES PATENTS

| Number | Name | Date |
| --- | --- | --- |
| 1,988,627 | Edwards | Jan. 1, 1935 |
| 2,166,309 | Lord | July 18, 1939 |